UNITED STATES PATENT OFFICE.

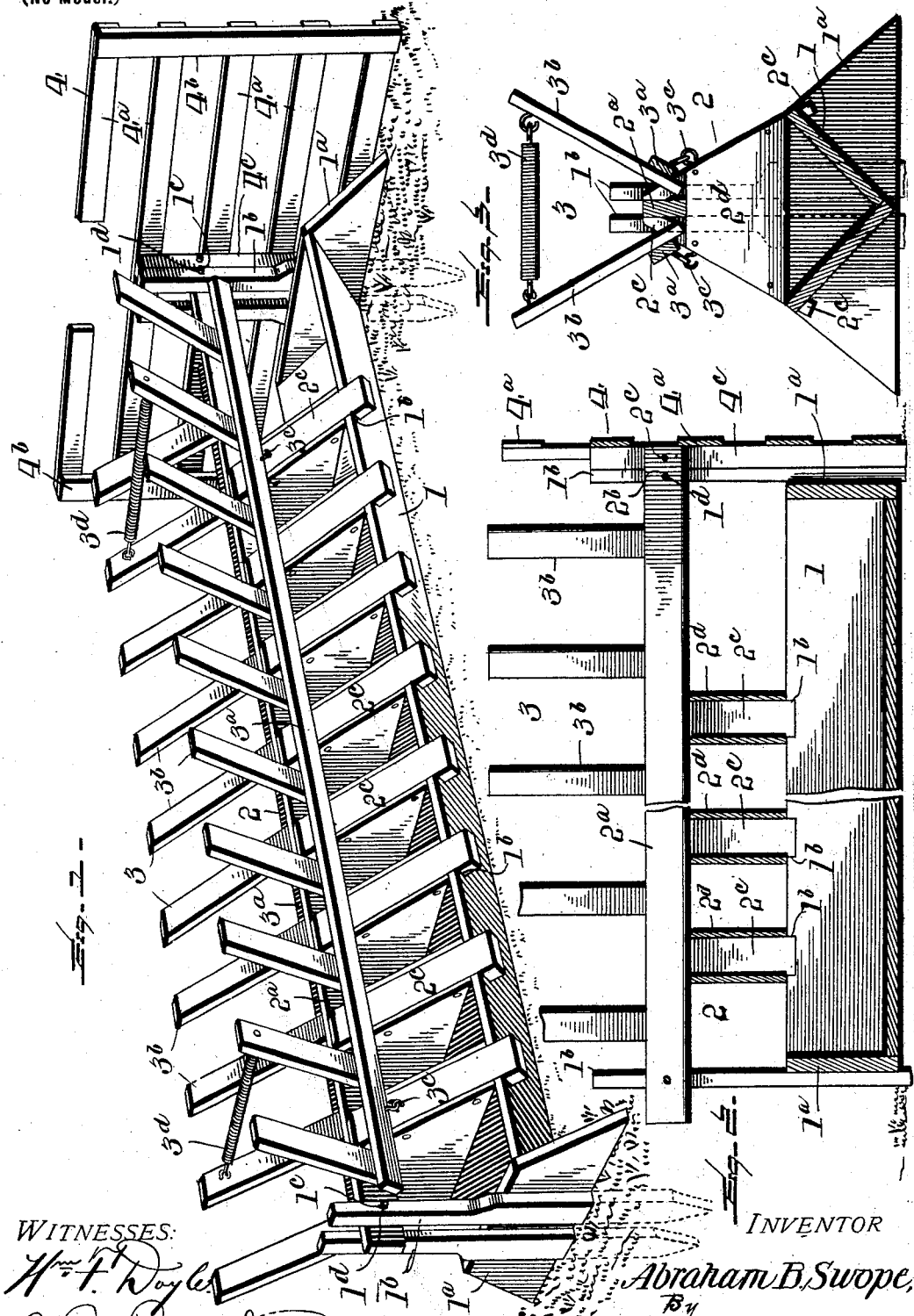

ABRAHAM B. SWOPE, OF FOSTORIA, OHIO.

COMBINED FEED TROUGH AND RACK.

SPECIFICATION forming part of Letters Patent No. 693,925, dated February 25, 1902.

Application filed December 5, 1901. Serial No. 84,744. (No model.)

*To all whom it may concern:*

Be it known that I, ABRAHAM B. SWOPE, a citizen of the United States, residing at Fostoria, in the county of Seneca and State of Ohio, have invented new and useful Improvements in a Combined Feed Trough and Rack, of which the following is a specification.

My invention relates to improvements in feed-troughs, and more particularly to a feed-receptacle adapted for different qualities of feed, one in a liquid or semiliquid form, the other in a dry state, such as hay, corn-fodder, and the like. It has for its objects to provide a simple, durable, and inexpensive construction capable of being placed in a field and the feed supplied to it without the inconvenience or annoyance of crowding of the animals around the feet of the attendant.

The trough is so constructed as to provide individual spaces on each side of appropriate dimensions, preferably about seven by seven inches, just large enough to allow a hog, calf, or sheep to get his nose to the bottom of the trough and yet preventing the animal from forcing his head through to another compartment, and thereby becoming caught. The rack is detachably secured in place, and although it is securely held in place it is readily removed for cleaning or washing out of the trough when desired. The divisional pieces are permanently secured to the ridge-pole and have inclined braces extending down into notches formed in the edge of the trough in such a way that when the parts are assembled and the securing means placed in the ends of the ridge-pole the parts form a compact structure, and no amount of rooting and crowding on the part of the animals will disturb the parts. Cross-braces are also provided that accomplish two results, one to strengthen the incline braces and also to prevent the animals from forcing their heads into the adjoining compartment and be caught back of an incline brace and force the same out of place. In this construction I not only use solid cross-braces to make the incline braces very rigid, but they also prevent the animal from getting back of the brace and forcing same out of place, the cross-braces acting as a guard or shield to the incline braces.

Another object is to provide means for supporting the dry and long feed in a crib above the trough proper, thereby removing the cause for most of the rooting done by hogs or the like when the liquid and dry feed are placed in one trough. The liquid feed being the most desired, the animals will root down under the hay or long feed to the bottom of the trough, with the result of throwing out the long feed on the ground to waste.

Another object is to provide means for preventing the stock crowding around the attendant's feet while supplying the feed to the trough. The end guard will act very satisfactorily in the center of a field; but the same may be left off and the trough placed adjacent to a fence. The fence will then take the place of the guard.

A further object is to provide means for securing a small or great amount of dry or long feed in the crib in such a way as to prevent the stock dragging it in any great quantity from the crib and wasting same, and by pointing the lower ends of the end standards they may be driven into the ground and prevent the device being thrown over.

These and other objects will appear in the specification and be particularly pointed out in the claims.

Similar reference-numerals indicate corresponding parts in all the figures of the drawings, in which—

Figure 1 is a perspective view of the improved feed trough and crib. Fig. 2 is a longitudinal section partly broken away. Fig. 3 is a transverse section.

Referring to the details of the drawings by numerals, 1 indicates the trough, the opposite sides of which are held at their proper angles to each other by end pieces $1^a$ $1^a$, as shown, which serve not only to close the ends of the trough, but also to form bases or rests upon which the ends of the trough may be supported from the ground. The trough may be of any desired length and subdivided into as many compartments as may be required. The trough is subdivided into compartments by a rack 2, composed of a ridge-pole $2^a$, located a short distance above the trough and extending longitudinally over the center of same, the ridge-pole protruding a short distance beyond the ends of the trough and provided with openings $2^b$ for the reception of securing means, to be described later. Permanently secured to either side of the ridge-pole at their upper ends are inclined braces $2^c$, resting at their lower ends in the notches $1^b$ of the trough. Any number of these braces forming the compartments may be used. The inclined braces $2^c$ are firmly held in position in relation to the ridge-pole and to each other by cross-braces $2^d$, secured one to each side of each pair of inclined braces, and extend, when the parts are assembled, from the upper edge of the trough up to the ridge-pole, as shown. The advantages of this construction will be brought out later.

The crib 3 for dry and long feed consists of two swinging halves or side members, hinged one on either side of the ridge-pole to the inclined braces, the longitudinal beams $3^a$ supporting the upwardly and outwardly extending arms $3^b$ and the hinges $3^c$, the pieces $3^b$ being secured to the main longitudinal beam of the crib between the inclined braces $2^c$ to facilitate the folding together of the parts or members of the crib. To adapt the crib to different quantities of feed, flexible connection is made between two or more of the upwardly-extending arms of the crib. As shown in the drawings, springs $3^d$ are employed, although the same result would be attained in the use of weights and pulleys.

Permanently secured to either end of the trough and extending above and below same are posts $1^b$ $1^b$, which are provided with openings $1^c$, registering with the openings $2^b$ in the ridge-pole and adapted when the parts are assembled to receive a rod $1^d$, forming, with the notches in the upper edges of the trough, a rigid securing means between the rack and trough. The lower ends of the end posts are pointed to adapt their being driven into the ground to prevent the animals overturning the device. The end pieces $1^a$ $1^a$ of the trough extending laterally, as shown, help to hold the trough in place.

Detachably secured to one end of the ridge-pole by a removable bolt is a guard 4 to prevent the stock crowding around the attendant's feet or under the wheels of a wagon used in the delivery of the feed. The guard is in about the form of a panel of fence, as shown, having longitudinal bars $4^a$ and vertical end bars $4^b$, also vertical parallel cleats $4^c$, adapted to strengthen the guard and having registering perforations for the reception of a bolt or rod to be passed through them and a perforation $2^e$ in the extreme end of the ridge-pole, the upper longitudinal bar $4^a$ of the guard being cut away to facilitate the delivery of feed to the trough and crib. The guard will not be necessary when the trough is built out from a fence, but it will operate very satisfactorily in the center of the field, where the feed-trough is very often placed. It will be seen, therefore, that the trough can be placed in the center of a field, and it will retain all the advantages of a trough of the old construction built out from a fence. The trough is secured firmly against overturning. The rack as constructed may be readily removed for cleaning the several parts of the device. It is firmly secured in place. Each compartment is of a size to allow free feeding of the stock, but prevents them from getting their feet into the trough. The cross-braces being solid pieces extending from the trough to the ridge-pole present a smooth surface to the stock and also form a shield or protection to the inclined braces to prevent the stock rooting back of the incline braces and forcing them off. The crib being placed above the trough, as shown, admits of the draining of the liquid feed into the trough, and in case the liquid and dry feed are delivered in a mixed state this device will separate same by simply throwing all into the crib. The crib is designed to firmly hold all dry long feed—such as hay, corn-fodder, and husks—allowing the escape only of the portions forcibly withdrawn by the animals, this same tension being maintained by the springs above referred to.

Having described my invention, what I claim is—

1. A feed-trough comprising a trough proper, a rack having inclined braces fitting in notches in the walls of the trough, transverse braces connecting each pair of inclined braces, an expansible crib secured to the rack, and means for detachably securing the rack in place, substantially as described.

2. A feed-trough, comprising a trough, a detachable rack having inclined braces and carrying an expansible crib, and cross-braces connecting each pair of inclined braces and means for preventing longitudinal movement of the inclined braces, substantially as described.

3. A feed-trough, comprising a trough proper having notches in its walls, a rack having inclined and cross braces, the inclined braces resting in the notches in the trough, a crib secured to the inclined braces and extending above the same, and means for yieldingly supporting the sides of the crib, substantially as described.

4. A feed-trough, comprising a trough proper, having notches in its walls, a detachable rack having inclined braces secured by cross-braces, an expansible crib having yieldingly-connected sides secured to the inclined braces, and means for supporting the trough above the ground, substantially as described.

5. The combination of a feed-trough having notches in its sides, of a removable rack having inclined braces fitting in said notches, a ridge-pole to which said inclined braces are attached, a crib secured to the inclined braces, and means for detachably but rigidly securing the ridge-pole in place, and cross-braces connecting each pair of inclined braces, substantially as described.

6. The combination of a feed-trough having notches in its sides, a removable rack having inclined braces fitting in said notches, a crib carried by said rack, and means for preventing the spreading of the inclined braces, substantially as described.

7. The combination of a feed-trough having notches in the upper edges of its sides, a removable rack having inclined braces, a ridgepole supporting said braces and solid crossbraces secured to either side of the inclined braces, and an expansible crib having flexibly-connected upper edges and hinge connection with the inclined braces, and a guard detachably secured to one end of the trough, substantially as described.

8. The combination of a feed-trough having notches in its upper edges, a removable rack having a ridge-pole, inclined braces and crossbraces, a crib having swinging sides yieldingly connected at their tops and hinged to the inclined braces at their bottom, end posts extending below the trough to be driven into the ground and extending above the trough to firmly but detachably secure the ridgepole, a guard removably attached to the end of the ridge-pole by cleats, as shown and described.

In testimony whereof I have affixed my signature in presence of two witnesses.

ABRAHAM B. SWOPE.

Witnesses:
FRED CESSNA,
GEO. W. CUNNINGHAM.